United States Patent [19]

Baker, Jr.

[11] 3,951,342

[45] Apr. 20, 1976

[54] EXTENDIBLE NOZZLE FOR A ROCKET MOTOR OR THE LIKE

[75] Inventor: William H. Baker, Jr., Sacramento, Calif.

[73] Assignee: Aerojet-General Corporation, El Monte, Calif.

[22] Filed: Feb. 15, 1973

[21] Appl. No.: 329,909

[52] U.S. Cl. .......................................... 239/265.33
[51] Int. Cl. .......................................... B64c 15/04
[58] Field of Search ................. 239/265.33, 265.39, 239/265.19; 102/49.3; 244/3.27, 3.28; 89/1.816; 60/22

[56] References Cited
UNITED STATES PATENTS

| 3,146,669 | 9/1964 | Wolf | 102/49.3 |
| 3,249,306 | 5/1966 | Altseimer | 239/127.1 |
| 3,270,504 | 9/1966 | Ward | 239/265.33 |

FOREIGN PATENTS OR APPLICATIONS

| 1,495,579 | 8/1967 | France | 244/3.27 |

Primary Examiner—Samuel Feinberg
Attorney, Agent, or Firm—Edward O. Ansell

[57] ABSTRACT

An extendible nozzle for a rocket motor or the like which nozzle is positioned in the aft end of the motor is disclosed having a main nozzle portion with an exit and entrance thereto and a plurality of elongated petals representing longitudinal sections or strips of a conically shaped structure hingedly connected by means of hinges at their forward ends to the exit portion of the main nozzle portion. The petals are selectively movable from a first or stowed position where the petals are all radially outward and slightly forward of the hinge locations to a second or deployed position where the petals form a smooth conical extension of the exit portion of the main nozzle portion. The petals are positioned to be in as close proximity to the aft motor dome of the rocket motor as possible while still allowing the required envelope or spacing for rocket dome-mounted components which are necessary to accomplish other motor/nozzle functions.

12 Claims, 9 Drawing Figures

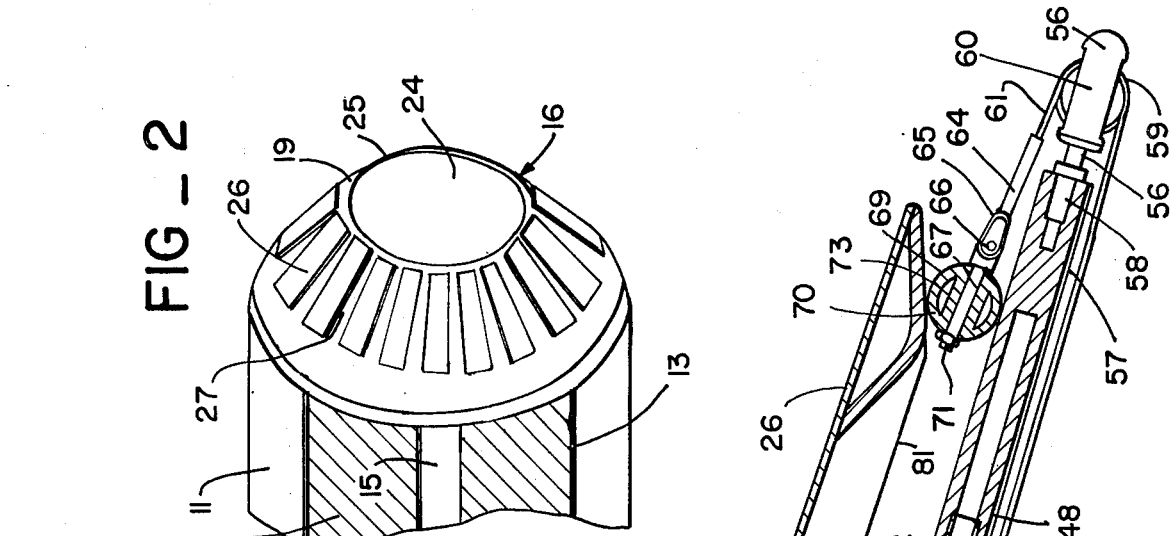
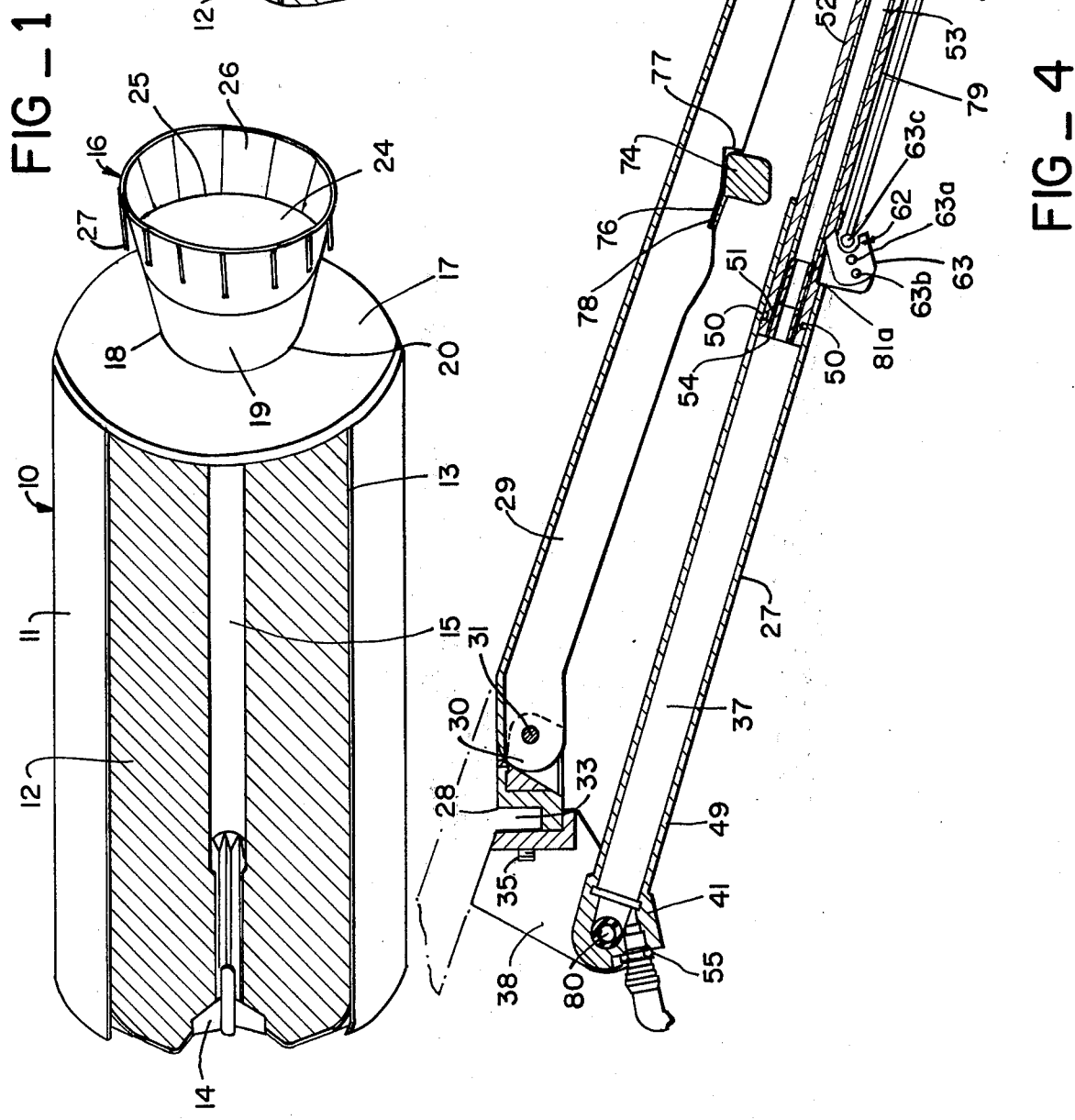

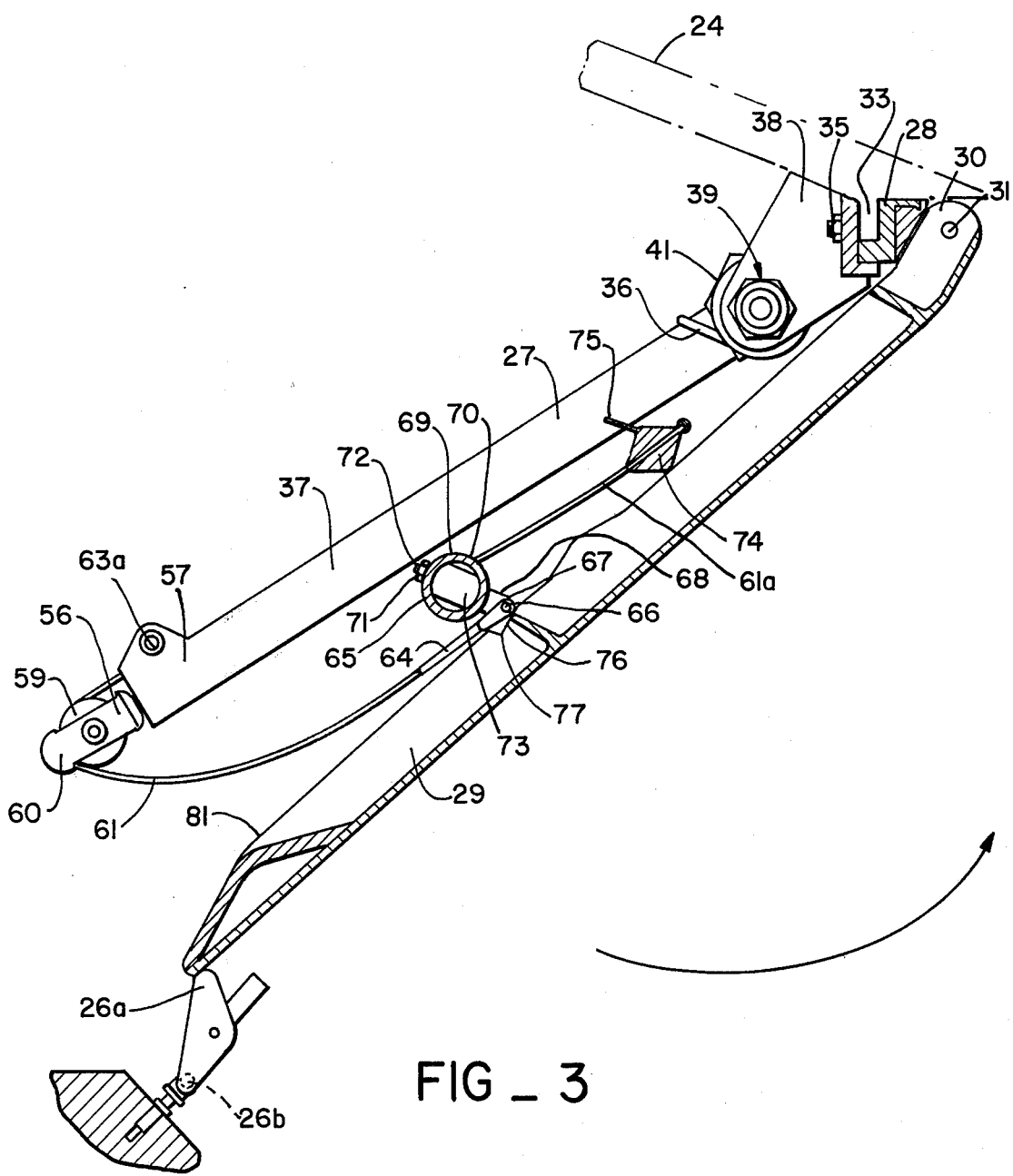
FIG_3

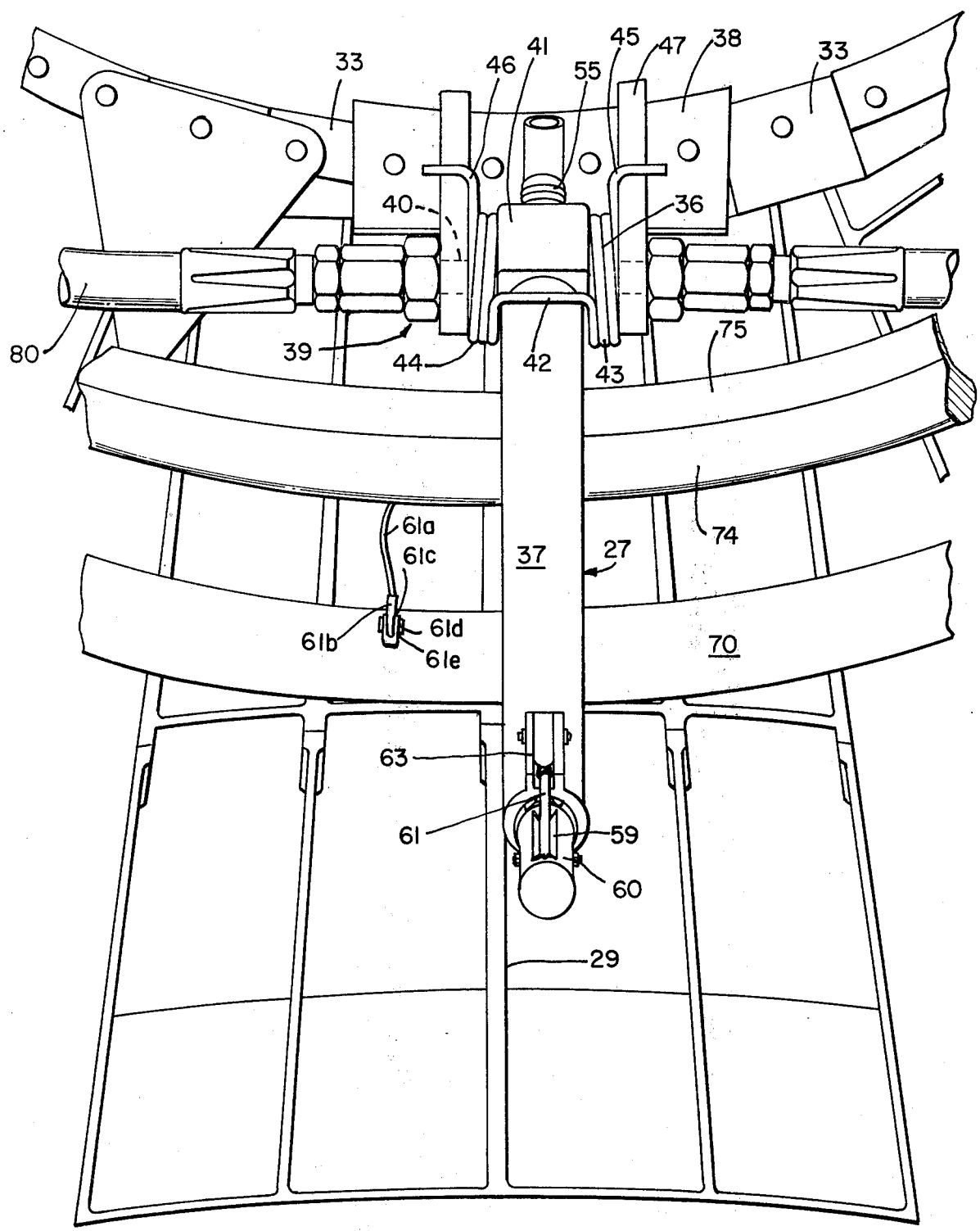
FIG_5

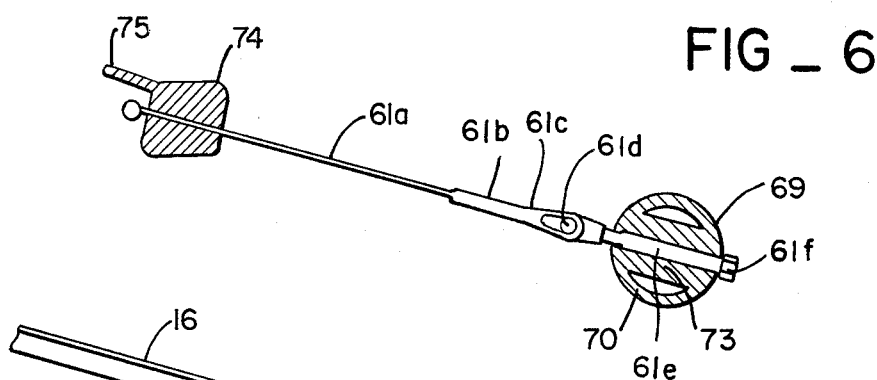
FIG_6
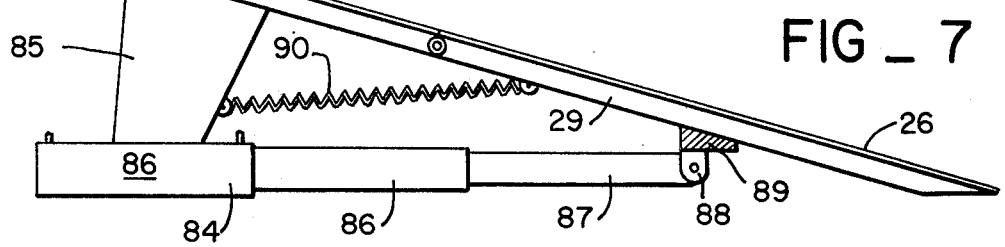
FIG_7
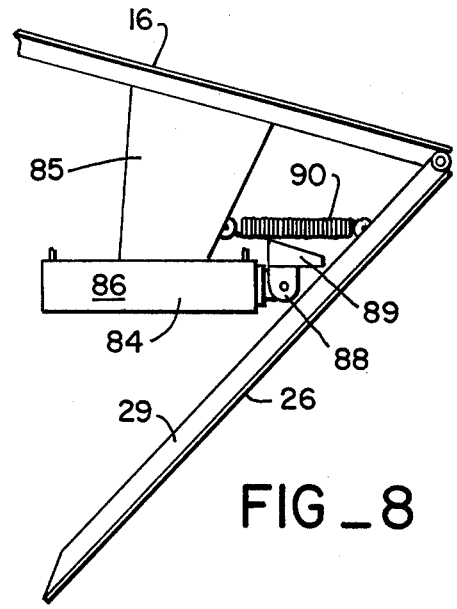
FIG_8
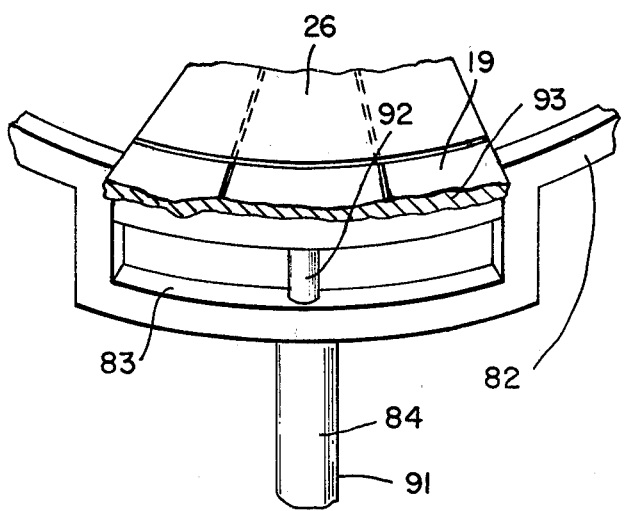
FIG_9

3,951,342

EXTENDIBLE NOZZLE FOR A ROCKET MOTOR OR THE LIKE

The invention described herein may be manufactured, used and licensed by or for the Government for governmental purposes without the payment of any royalty thereupon.

BACKGROUND OF THE INVENTION

1. Field of the Invention

The invention relates to nozzles; and, more particularly, to a nozzle for a motor, such as a rocket motor, which can be folded, then extended to provide additional nozzle length.

2. Description of the Prior Art

In certain circumstances, fully extended nozzles raise problems due to their overall length. For example, in certain types of rocket-powered missile or vehicle systems, the length of such nozzles is limited due to the clearances available. This raises problems in attempting to provide additional nozzle length so as to increase the expansion ratio of the nozzle and overall nozzle performance. It is thus sometimes desirable to have a nozzle which can fully utilize the existing diametrical clearances in such systems to both provide for storage and subsequent expansion thereof while requiring only minimal axial distances or envelopes to accomplish such expansion. There are other prior-art extended exit cone systems; however, such systems, as a general rule, require more axial length for storage (i.e., in the stowed position).

SUMMARY OF THE INVENTION

It is an object of this invention to provide a nozzle which can be selectively moved from a folded position to a fully extended position.

It is another object of this invention to selectively move such a nozzle between these positions in both a passive or signalled manner.

These and other objects are preferably accomplished by providing a nozzle for a rocket motor or the like which nozzle is positioned at the aft end of the motor having a main nozzle portion with an exit and entrance thereto and a plurality of elongated petals representing longitudinal sections or strips of a conically shaped structure hingedly connected by means of hinges at their forward ends to the exit portion of the main nozzle portion. The petals are selectively movable from a first or stowed position where the petals are all radially outward and slightly forward of the hinge locations to a second or deployed position where the petals form a smooth conical extension of the exit portion of the main nozzle portion. The petals are positioned to be in as close proximity to the aft motor dome of the rocket motor as possible while still allowing the required envelope or spacing for rocket dome-mounted components which are necessary to accomplish other motor/nozzle functions.

BRIEF DESCRIPTION OF THE DRAWING

FIGS. 1 and 2 are longitudinal views of the nozzle of my invention as applied to a rocket motor FIG. 2 being a partial view thereof), the nozzle being shown in the fully extended and fully folded positions respectively;

FIGS. 3 and 4 are longitudinal views of one of the petals and its actuating means of the nozzle of FIGS. 1 and 2 in its fully folded and fully deployed positions, respectively;

FIG. 5 is a partial view of the releasing means for the petals of the nozzle of my invention;

FIG. 6 is a longitudinal view of a portion of the actuating mechanism of FIGS. 3 and 4;

FIGS. 7 and 8 are detailed views of a modification of the retracting means for the petals of my system; and FIG. 9 is a detailed view of a modification of the petal deployment of my system.

DESCRIPTION OF THE PREFERRED EMBODIMENT

Referring now to FIGS. 1 and 2 of the drawing, a conventional rocket assembly 10 is shown which may comprise the first-stage motor in a rocket propulsion system. Of course, the nozzle of my invention is also applicable to other stage motors, such as the second stage therefor, and comments concerning a first-stage motor would be applicable to both. Thus, assembly 10 shows a rocket casing 11 housing therein a propellant chamber 12 and an insulative liner 13. Suitable propellants and insulations may be disposed in each chamber. A conventional igniter assembly 14 communicates, at the forward end of rocket casing 11, with the propellant chamber 12 as is well known in the rocket propulsion art. A rocket motor chamber bore 15 extends longitudinally of casing 11 and is in communication with an extendible exit cone assembly 16 at the aft end thereof to form a discharge opening 20 from casing 11 to cone assembly 16. Cone assembly 16 forms an exit cone for rocket assembly 10. As is the normal case in this art, the aft or dome end of rocket casing 11 is bullet-nosed or the like, that is, generally bluntly tapered as at aft motor dome 17. Any suitable means may be used to connect cone assembly 16 to rocket casing 11. For example, the entrance or convergent portion 18 of nozzle 19 may be coupled to the discharge opening 20 as illustrated in U.S. Pat. No. 3,698,192 to Febore. That is, the convergent or entrance portion 18 of nozzle 19 may be partially submerged in opening 20 as shown in the aforementioned patent. Such a connection results in a movable nozzle. However, nozzle 19 may be fixed, if desired, as is well known in the rocket art. In any event, in operation of rocket assembly 10, the nozzle 19 is adapted to take both axial compressive loads due to pressure from rocket motor chamber 15 and shear loads due to movement of nozzle 19 for thrust vector control.

In FIG. 1, the nozzle 19 is shown as comprised of a convergent or main nozzle portion 24 having both the aforementioned entrance or convergent portion 18 and an exit or divergent portion 25. This divergent portion 25 may be extended, as shown, by means of a plurality of elongated folding petals 26, the operation of which will be described in detail hereinbelow. Actuating means 27, as will also be described hereinbelow, is operatively connected to both main nozzle portion 24 and the petals 26 (the particular connection of means 27 to main nozzle portion 24 is shown only partially in FIG. 1 and will be described in more detail hereinbelow).

FIG. 2 shows petals 26, before actuation of actuating means 27, in their fully folded position. Thus, in operation, in the FIG. 2 position, the petals 26 are shown as stowed prior to usage. That is, they are positioned to be in as close proximity to the aft motor dome 17 as possible while still allowing the required envelope or spacing for dome-mounted components which are necessary to accomplish other motor/nozzle functions. When desired to extend cone assembly 16 to its fully extended position, petals 26 are extended, via actuating means 27, to form an exit cone for the chamber 12. The total number of petals 26 may of course vary; preferably twelve such petals 26 are used in the embodiment disclosed. That is, petals 26, in their stowed position in FIG. 2, are folded forward near the aft dome 17 of the rocket motor. The actuating means 27 is also in its stowed or non-deployed position.

Referring now to FIGS. 3 and 4, it can be seen that petals 26 are hingedly connected to main nozzle portion 24. This may be accomplished by providing a plurality of apertured hinge blocks 28 about the periphery of the exit portion 25 of main nozzle portion 24 (see also FIG. 2 — blocks 28 are not visible but under petals 26). In like manner, elongated flanges or supporting ribs 29 extend along the outer surfaces (i.e., the surfaces outside of the nozzle stream) of petals 26. These ribs 29 terminate, adjacent main nozzle portion 24, in apertured flange portions 30. A plurality of pins 31 extend through hinge blocks 28 and flange portions 30 to form a complete hinge arrangement for petals 26. The hinge blocks 28 and flange portions 30 may be arranged so that pins 31 extend through a single hinge block 28 and more than one flange portion 30. That is, if twelve petals 26 are used, there may be twelve blocks 28 and twelve pins 31.

The overall length of each petal 26 is determined by the diameter and axial location of their point of hinging to main nozzle portion 24 and the orientation of the petals 26, when in their stowed — FIG. 2 — position, within the vehicle with which rocket assembly 10 is associated (that is, the space available therein — generally referred to as the "vehicle diameter"). Petals 26 are preferably slightly arcuate in cross section to provide the inner conical shape of nozzle 19.

The aft or exit portion 25 of main nozzle portion 24 may be provided with a peripheral main nozzle portion flange 33 from which hinge block 28 extends and is bolted thereto. The petals 26, their supporting longitudinal ribs 29, pins 31, and nozzle 19 may all be fabricated of a material which exhibits high strength at greatly elevated temperatures, such as high modulus fibrous graphite or carbon. Hinge blocks 28 may be of similar material or a combination metal and ablative plastic material, if desired.

It is necessary that petals 26 be locked when in their deployed position. This is required to support petals 26 against internal exhaust pressure so as to maintain them in this position. Referring again to FIGS. 3 and 4, one of the petals 26 is shown with its actuating means 27. Of course, each remaining petal 26 and means 27 is similar; the discussion of FIGS. 3 and 4 thus applies to these remaining petals 26. Accordingly, hinge block 28 is secured, via a bolt 35 or the like, to the peripheral rib 33 of the aft or exit portion 25 of main nozzle portion 24.

Prior to deployment of petals 26, the petals 26 may be retained in the FIG. 2 stowed position by any suitable means, as for example,, by pads or the like (not shown) in the vehicle interstage during separation or by a separate retention system, such as pivotally mounted release levers 26a (FIG. 3) which are signaled at ignition to pivot about pivot pin 26b and release petals 26.

After release of the retention system, a plurality of doubly-wound torsion springs 36 (FIG. 5) six such springs, for example, which are located on each of the actuating means 27, cause the shafts 37 of actuating means 27 to begin to rotate aft or outwardly away from the motor. As discussed above, in FIG. 3, only six such actuating means 27 may be required. Obviously, the total number thereof may vary. This rotation is accomplished by providing a plurality of actuator mounting brackets 38 about the periphery of flange 33. Conventional fittings 39 also extend about the periphery of flange 33 and are retained in place by passing through suitable apertures 40 in the arms 47 of brackets 38. Shafts 37 are in turn fixedly secured to fittings 39. This may be accomplished by providing blocks 41 at the hinged end of shafts 37. These blocks 41 may include threaded apertures for receiving threaded ends of fittings 39 therethrough. The springs 36, as clearly shown in FIG. 5, include a U-shaped portion 42 extending about shaft 37 and retained in position thereon by abutment with block 41. The coiled portions 43 and 44 of spring 36 extend from opposite sides of portion 42, about fittings 39, and terminate in L-shaped ends 45, 46 which abut against the retaining arms 47 of brackets 38.

In operation, upon release of petals 26, the spring 36, normally biased in the outward direction, automatically pivot shafts 37 and petals 26 about fittings 39 and hinges 31, respectively. This spring force is assisted in flight by aft-directed inertial forces resulting from the motor acceleration acting on system components.

As shown in FIG. 4, shafts 37 are in reality two telescoping sections 48 and 49, the first section 48 telescoping into the second section 49 (which carries block 41 at its hinged end). Both sections 48, 49 are preferably tubular and generally hollow. A conventional O-ring 50 is disposed in an annular groove 51 formed in the outer wall 52 of first section 48 for providing a seal between these sections.

A piston 53 is disposed in each first section 48 and slidable therein. A propellant grain chamber 54 is associated in each first section 48 with piston 53. Igniting means 55 are disposed at the lower ends of shafts 37. Igniting means 55 is in turn coupled to a suitable igniting source, such as an electrical charge (not shown) remote from actuating means 27. In the FIG. 3 position, first section 48 is telescoped into second section 49. Thus, the propellant grain in chamber 54 of piston 53 is adjacent igniting means 55.

A pulley support 56 is fixedly secured to the outer end 57 of first section 48, as by having a shaft portion 58 fixedly secured in the outer end 57 (see FIG. 5). A pulley wheel 59 is retained within the yoke portion 60 of pulley support 56. An actuator or deployment cable 61 extends about the groove of pulley wheel 59 and has one end terminating in a knot 63c or the like secured within an aperture 62 or the like (see FIG. 5) of a cable anchoring cam 63 which pivots on a shaft 63a mounted on the outer end of section 49. A shear pin 63b maintains cam 63 and cable 61 in this position. The opposite or free end of cable 61 is secured to the shaft 64 of a clevis-type bolt 65 which is pivotally connected, via pin 66, to the shaft 67 of a deployment ring 69. The shaft 68 extends through a sleeve portion 73 of the main ring body portion 70 of ring 69, out the other side thereof, and is connected thereto by the nut 71 or the like threaded on the free end thereof. As shown in FIGS. 3, 5 and 6, a like cable 61a is connected at one end to the shaft 61b of a like clevis-type bolt 61c which is also pivotally connected, via shear pin 61d, to a shaft 61e extending through deployment ring 69 and secured thereto by nut 61f (see particularly FIG. 6). Cable 61a is in turn connected to a locking ring 74 which ring 74 is generally annular, thus related to the annular distance extending about the outer surfaces of petals 26 (when deployed) as will be explained more fully hereinbelow. Ring 74 may be of fibrous graphite or other suitable material. Ring 69 may be of aluminum or other suitable material. Ring 74 may include a locking finger 75 extending inwardly toward the main nozzle portion 24 of nozzle 19 as will also be explained shortly. Grooves 76 are formed in the outer surfaces of petals 26 conforming generally to the configuration of the cross section of ring 74 and finger 75 (see particularly FIG. 4). Thus, ring 74 is preferably generally square in cross section with rounded corners, and grooves 76 include an abutment shoulder 77 and an elongated depression portion 78 for receiving both ring 74 and finger 75 as shown.

In operation, after release of petals 26 as discussed hereinabove, the actuating means 27, as a group rotate aft past a radial distance of about 90° to the centerline position (i.e., overcenter), igniting means 55 are ignited, via a remote electrical charge, for example, to ignite the propellant grains in chamber 54 positioned within pistons 53 of the outer section 48 of each actuating shaft 37. With the actuating shafts 37 in this position, and with the propellant grains burning at a low pressure, slack is steadily taken out of the cable 61 connected to ring 69, which cable 61 passes about pulley wheel 59 — affixed to the outboard end 57 of piston shaft section 48 — and extends on to the cable anchoring cam 63. Cam 63 also serves as a guide for cable 61 by projecting into a slot 79 (FIG. 4) milled into the outer surface of the inner end of section 48 and thereby keeps the groove of pulley wheel 59 aligned with deployment cable 61. Obviously, other known means of supplying pressure to the piston may be utilized.

As the slack in the cable 61 is taken up, deployment ring 69 (and of course locking ring 74 carried thereby) is pulled aft and all parts thereof rotate inward or outward, depending upon the natural balance of forces present. The resisting force to the actuating means 27 is the pneumatic spring force of the exhaust plume around which means 27 is attempting to close. The pressure contained within each individual actuating means 27 is balanced against that in the remaining actuating means 27 by means of conventional balance hoses 80 operatively connected to fittings 39 (see FIG. 5) located on opposite sides of, and therefore between, each actuating means 27 and in selective fluid communication with pistons 53 (see FIG. 4). In addition to balancing the pressure of pistons 53 in a normal operational mode, balance hoses 80 also allow the overall actuating system (i.e., the six actuating shafts 37) to deploy if one propellant grain fails to ignite. That is, the remaining five grains are sized to generate enough energy to deploy the entire system.

As the deployment actuation continues, ring 69 is continually pulled aft by the actuation system thus forcing petals 26 together in the process. The system is self-stabilizing due to the fact that the grains burn at a higher or lower rate, depending upon the resisting force and pressure within pistons 53.

When ring 69 fully closes together petals 26, it is located axially with respect thereto and rides on the surface 81, which may be generally cylindrical, of the ribs 29 of petals 26 (see FIG. 4 — ring 69 having moved along surface 81 in FIG. 3 to the FIG. 4 position). At this point, cable portion 61a has pulled the locking ring 74 onto its seat or groove 76 and is retained therein by abutment against shoulder 77 (see FIG. 4). Finger 76 is first deflected as ring 74 passes along rib 33, then seats into the retaining groove 76. All these grooves 76 are, of course, annularly aligned about the outside of ribs 29.

As the deployment ring 69 continues to move, pin 61d shears, thus separating locking ring 74 from deployment ring 69, leaving ring 74 in groove 76 (i.e., the FIG. 4 position). Any other mechanical means of providing the necessary force to insert the ring 74 in the grooves 76 and separate ring 69 therefrom may be used.

As pistons 53 extend slightly further, a ramp 81a, located at the forward end of the elongated guide slot 79 (FIG. 4) in piston 53, shears pin 63b causing the cable anchoring cam 63 to rotate in an outboard direction, releasing the knotted end 63c of the cable 61 from the aft end of the outer actuator cylinder section 49.

Thus freed, the remaining pressure within outer cylinder section 49 moves pistons 53, deployment ring 69 and the cable 61 off the entire system where the components fall away free thereof, thus decreasing the overall weight of the system.

Finally, after these components have fallen away, torsion springs 36 reorient the cylinder sections 48, 49 away from petals 26 so as to eliminate the possibility of impact damage during thrust vectoring of the exit cone assembly 16.

It can be seen from the foregoing that I have described a unique system for stowing a portion of a nozzle in a vehicle with which the nozzle is associated, then automatically deploy the stowed portion into an extended postion thereby increasing the overall nozzle length. Such a system is accomplished in a relatively simple and efficient manner and certain parts thereof are automatically released from the system after fulfilling their function.

If a slight increase in weight were not a problem, locking ring 74 and its associated functions could be oriented as shown directly by cable 61 without release or ejection of any component.

The stowed portions of my nozzle and the actuating system thereof may be readily adapted to a conventional nozzle. The folding petals may be used with a multitude of devices, which accomplishes their deployment or rotation into the extended position. However, a preferred mode of operation has been set forth hereinabove. As described hereinabove, the main nozzle portion 24 of nozzle 19 may be extended, via petals 26 and actuating means 27, with the petals 26 left in their deployed position for applications which might deal with tactical missiles which are only used once (and thus are expendable). If petals 26 are used in a vehicle which is not expendable, it may be desirable to retract petals 26 so as to have an aerodynamically "clean" nozzle for purposes of reentry. This may be accomplished by means of a plurality of conventional linear actuators 84 as shown in FIGS. 7 and 8. These actuators 84 may be remotely actuated by any suitable means, such as hydraulic, pneumatic, electromechanical, etc., which may be carried out on command from either pilot or remote signal. Each actuator 84, and there may be any suitable number thereof, such as four spaced about cone assembly 16, is comprised of an outer main body member 86 having an inner member 87 telescopingly mounted therein. A flange 88 is pivotally secured to the outer end of member 87 which is in turn fixedly secured to an annular locking ring 89. A petal return or retract spring 90 is fixedly secured to bracket 85 and each petal 26, respectively. Upon actuation of actuators 84, ring 89, is moved along the ribs 29 of each petal 26 (the FIG. 8 position) to its outer extent (the FIG. 7 position). Since the underside of ring 89 is configured or tapered as shown, grooves 76 may be eliminated. Upon release of actuators 84 to retract inner members 87, springs 90 assist in returning petals 26 back to their stowed positions. Of course, all the parts should be of a heat-resistant material or otherwise insulated from the heat generated by the radiation-cooled petals 26 during firing pulses of the rocket assembly 10. The foregoing discussion is of course applicable to either liquid propellant engine or solid rocket motor operation.

If the foregoing system is to be used to augment thrust on either a missile or space vehicle, the system described hereinabove may be used to provide required vehicle thrust vector control by differentiation of the relative positions of opposing individual petals 26 within the system. For example, the petals 26 and actuating means 27 therefor are first fixed or otherwise attached to a fixed, non-swiveling exit cone attached to the thrust chamber of the rocket assembly.

The petals 26 are then deployed and locked in the extended position also as described hereinabove. However, locking ring 74 may be modified, as shown by ring 82 in FIG. 9, to have offset portions 83 therein related to, say, four of the petals 26 equally spaced apart, say 90°, so as to allow these petals 26 to move a distance outwardly of up to, say, about 10° from their otherwise normal deployed position. Also, the petals 26 illustrated hereinabove are close to one another but have a sufficient clearance therebetween so that — in the FIG. 9 embodiment — the petals 26 in the offset portions 83 may move a like distance (i.e., about 10° or so) inwardly toward the exhaust stream of cone assembly 16. Also as shown in FIG. 9, a small conventional linear actuator 91 or the like, having piston shafts 92 extending through apertures in portions 83, may be located in each offset portion 83 behind each movable petal 26, such that signals sent to it (remotely, if desired) and energy provided to it allows the petal movable support 93, carried by shaft 92, to operatively engage the outside of its respective petal 26, to move its petal 26 in or out in a prescribed manner.

By this arrangement, with one petal 26 being moved a short distance into the exhaust stream and its opposite petal 26 being moved a like distance away from the exhaust stream, via selective remote control of actuators 91, a net force is exerted on the nozzle assembly and hence to the vehicle providing the required turning moment. Of course, this system of thrust vector control is also applicable to either solid rocket motors or liquid propellant rocket engines.

It is to be understood that while the apparatus herein described constitutes preferred and/or exemplified embodiments of the invention, the invention is not to be limited thereto, for it will be evident to those skilled in the art that numerous changes and modifications may be made in the details involved without departing from the scope and spirit of my invention, which is to be construed as broadly as the following claims may allow.

I claim as my invention:

1. An extendible nozzle for a rocket motor or the like comprising:
    a generally conically shaped main nozzle portion having an entrance portion and an exit portion;
    a plurality of petals representing longitudinal strips of a conically shaped structure hingedly connected by means of hinges at their forward ends to the periphery of said exit portion;
    petal retention means operatively connected to all of said petals for selectively holding said petals in said first position; and
    petal moving means including torsion spring means operatively connected to both said main nozzle portion and all of said petals for selectively moving said petals from a first or stowed position whereby all of said petals are radially outward and slightly forward of the hinge locations to a second or deployed position where the petals form a smooth conical extension of the exit portion of said main nozzle portion upon release of said retention means.

2. The nozzle of claim 1 wherein each of said petals includes an elongated rib extending along the outer surface thereof and generally normal to the plane of said petals and a peripheral groove formed on the outer surface of said petals, all of said grooves being annularly aligned.

3. The nozzle of claim 2 further including locking means operatively connected to both said petals and said petal moving means for locking said petals in said second position.

4. The nozzle of claim 3 wherein said locking means includes an annular locking ring and selectively extensible piston means operatively engaging said locking ring for moving said locking ring into said annularly aligned grooves.

5. The nozzle of claim 4 wherein said piston means includes a piston and selectively ignitible igniting means operatively connected to said piston for extending said piston upon ignition of said igniting means.

6. The nozzle of claim 5 wherein said locking means includes a pully at the free end of said piston, and a cable connected to both the free end of said piston and said pulley, and an annular deployment ring extending about the outer periphery of said fins and coupled to said cable, said locking ring being coupled to said deployment ring and carried thereby upon deployment of said deployment ring.

7. The nozzle of claim 6 wherein said deployment ring is releasably connected to both said locking ring and said piston.

8. The nozzle of claim 7 wherein said locking ring is generally square in cross section with a locking finger extending from one face thereof, and said groove includes a shoulder portion for retaining said locking ring therein and an elongated portion for retaining said finger therein.

9. The nozzle of claim 8 including balancing means operatively connected to said extensible piston means for balancing the pressure of the piston means.

10. The nozzle of claim 9 wherein said locking ring includes a plurality of offset portions spaced along the inner periphery thereof, at least two directly opposite petals, and means operatively connected to both said locking ring and said directly opposite petals for selectively moving each of said directly opposite petals into or out of the central axis of said nozzle.

11. The nozzle of claim 10 wherein said means for moving said directly opposite petals includes means thereon for moving said directly opposed petals about 10° into or out of the central axis of said nozzle with respect to their second extended position.

12. An extendible nozzle for a rocket motor or the like comprising:
- a generally conically shaped main nozzle portion having an entrance portion and an exit portion;
- a plurality of petals representing longitudinal strips of a conically shaped structure hingedly connected by means of hinges at their forward ends to the periphery of said exit portion; and
- petal moving means operatively connected to both said main nozzle portion and all of said petals for selectively moving said petals from a first or stowed position whereby all of said petals are radially outward and slightly forward of the hinge locations and spaced longitudinally from one another to a second or deployed position where the petals close together to form a substantially smooth continuous conical extension of the exit portion of said main nozzle portion, petal retention means operatively connected to all of said petals for selectively holding said petals in said first positions, said petal moving means including torsion spring means operatively engaging said petals for moving said petals to said second position upon release of said retention means.

* * * * *